Figure 1:
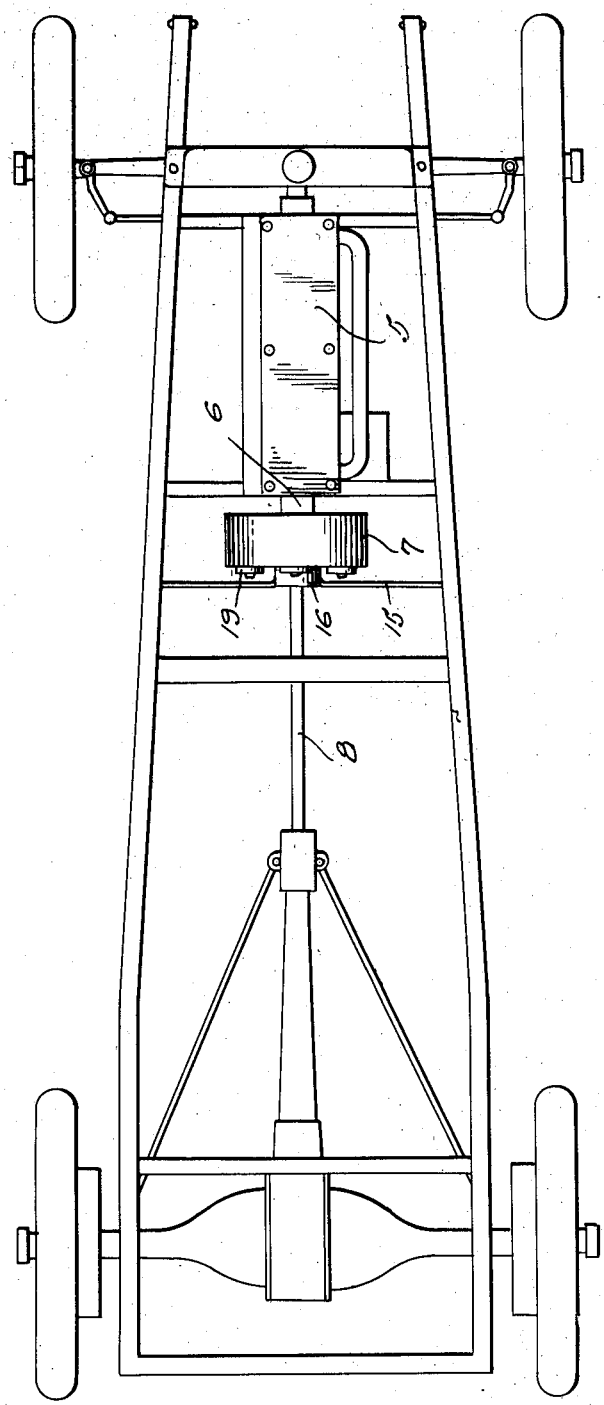

Oct. 18, 1927.  
J. B. WHITLOW  
1,645,841  
TRANSMISSION MECHANISM  
Filed July 22, 1927  
2 Sheets-Sheet 1

Inventor  
J. B. Whitlow  
By Clarence A. O'Brien  
Attorney

Oct. 18, 1927.

J. B. WHITLOW

TRANSMISSION MECHANISM

Filed July 22, 1927

1,645,841

2 Sheets-Sheet 2

Inventor

J. B. Whitlow

By Clarence A. O'Brien
Attorney

Patented Oct. 18, 1927.

1,645,841

UNITED STATES PATENT OFFICE.

JOHN B. WHITLOW, OF LEXINGTON, KENTUCKY.

TRANSMISSION MECHANISM.

Application filed July 22, 1927. Serial No. 207,718.

The present invention relates to a transmission mechanism designed for use on automobiles and the like and aims to provide a structure which eliminates the necessity of the use of a clutch and also eliminates the necessity of the use of a gear shifting mechanism.

A still further very important object of the invention lies in the provision of a transmission mechanism of this nature which is simple in its construction, compact, inexpensive to manufacture, efficient and reliable in operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

Figure 2:
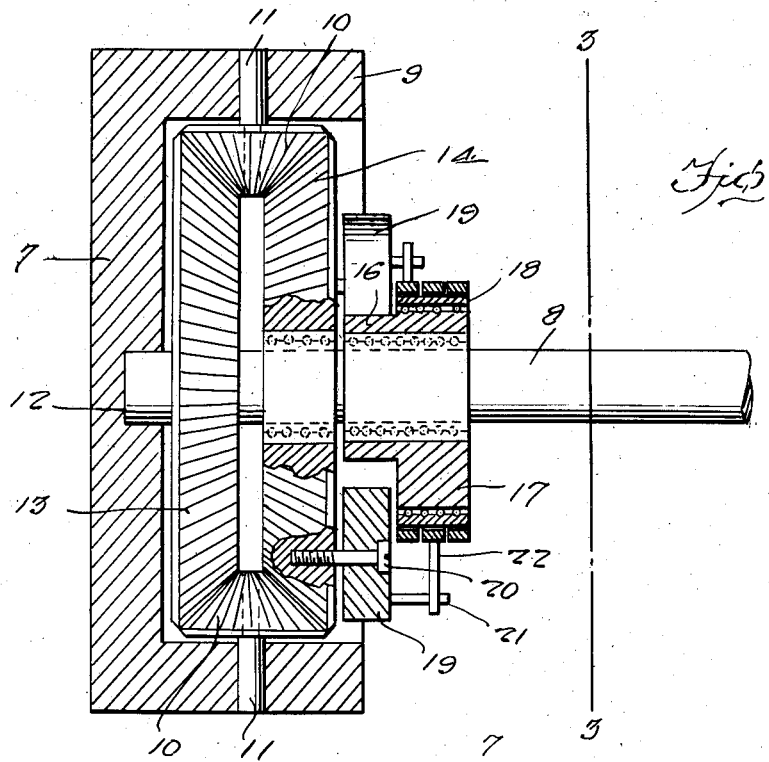
Figure 3:
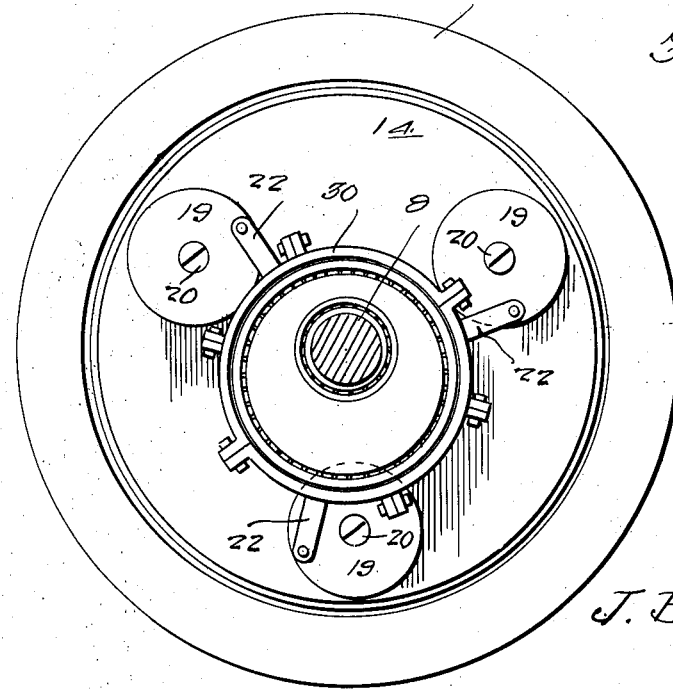

In the drawing:

Figure 1 is a top plan view of an automobile chassis showing my improved structure disposed between the internal combustion engine and the drive shaft, Figure 2 is a sectional view through the mechanism, Figure 3 is a sectional view taken substantially on the line 3—3 of Figure 2, looking to the left.

Referring to the drawing in detail it will be seen that the numeral 5 denotes an internal combustion engine having a crank shaft 6 operating a flywheel 7. The numeral 8 denotes the automobile drive shaft which in the present instance is hereinafter referred to as the driven shaft to distinguish it from the engine or power shaft 6 which will be referred to as the drive shaft.

The flywheel is formed with a flange structure 9 having beveled gears or pinions 10 journaled on stub axles 11 projecting inwardly from the flange 9. The driven shaft 8 is journaled in the flywheel as at 12 co-axially therewith. The beveled gear 13 is fixed to the driven shaft within the flange of the flywheel and meshes with pinions 10. A beveled gear 14 is rotatable on the shaft 8 within the flange 9 and meshes with the pinions 10. A cross member 15 supports the bearing 16 through which the shaft 8 is journaled. A portion of this bearing has a circular periphery 17 eccentric to the axis of the shaft 8. A ring 18 is rotatable about the eccentric annular periphery 17. A plurality of pendulums 19 are rockably mounted as at 20 on the gear 14. These pendulums 19 are in the form of disks rotatably mounted at their centers and said centers 20 are equidistant from the center of the gear 14. Rods 21 project from off center points of the pendulums 19. Rods 22 are engaged on rods 21. The rods 22 have sectional rings 30 to engage about the ring 18.

From the above detailed description it will be seen that when the shaft 6 is rotating slowly, causing the rotation of the flywheel 7 the pinions 10 will move about in a circular orbit and ride about the gear 13 causing the gear 14 to rotate. The rotation of the gear 14 will cause the oscillation on the pendulums 19 because of the rotation of the ring 18 about the eccentrically disposed annular periphery 17. As is well known, an ordinary pendulum may be swung with little effort through a predetermined arc at a certain rate of oscillation but to increase the speed of the oscillation through the same arc the power must be increased manyfold. Bearing this principle in mind it will be seen that when the flywheel 7 increases its speed there is a great resistance set up to the faster oscillation of pendulums 19 so as to retard the speed of the gear 14. The retarding of the speed of the gear 14 will cause the rotation of the gear 13 and the shaft 18 through the movement of the pinion 10 in the circular orbit previously described as they will ride about the gear 14 and therefore must impart rotary motion to the gear 13 and the shaft 8.

In this manner it will be seen that there is no necessity of a clutch in the use of an internal combustion engine in driving an automobile or under like circumstances and there is also no need of gear shifting mechanism as the less resistance which will be offered by the shaft 8 and the greater the speed of the flywheel 7 the faster the automobile will travel.

It is thought that the construction, operation, and advantages of this invention will now be clearly understood by those skilled in this art without a more detailed description thereof. The present embodiment of the invention has been disclosed in detail merely by way of example since in actual practice it attains the features of advantage enumerated as desirable in the statement of the invention and the above description. It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

In combination, a drive shaft, a driven shaft, a flywheel on the drive shaft having a flange, a plurality of pinions, means for mounting the pinions in the flange, said driven shaft having one end journaled in the flywheel coaxially therewith, a gear on the driven shaft meshing with the pinions, a second gear on the driven shaft meshing with the pinions, the first gear being fixed to the driven shaft, and the second gear rotatable thereon, an annulus mounted eccentrically to the axis of the driven shaft, a ring rotatable about the annulus, a plurality of pendulums rockably mounted on the second gear, connecting rods between the pendulums and the ring.

In testimony whereof I affix my signature.

JOHN B. WHITLOW.